United States Patent [19]

Lane

[11] 3,788,109
[45] Jan. 29, 1974

[54] VEHICLE SECURING DEVICE
[76] Inventor: Gerald H. Lane, 1350 Holiday Lane No. 240, Fairfield, Calif.
[22] Filed: Dec. 5, 1972
[21] Appl. No.: 312,301

[52] U.S. Cl. .................................. 70/234, 211/5
[51] Int. Cl. ....................... E05b 71/00, B62h 5/16
[58] Field of Search ...... 70/234; 211/5, 19; 292/148

[56] References Cited
UNITED STATES PATENTS
| | | | |
|---|---|---|---|
| 639,517 | 12/1899 | Butcher | 70/234 X |
| 1,202,444 | 10/1916 | Soleau | 70/234 X |
| 3,334,933 | 8/1967 | Ehlers | 292/148 |

Primary Examiner—James R. Boler
Assistant Examiner—Peter Nerbun
Attorney, Agent, or Firm—Flehr, Hohbach, Test, Albritton & Herbert

[57] ABSTRACT

A vehicle securing device for attachment to the perimeter of a spoked vehicular wheel houses a bicycle lock, shielding it from tampering and disabling the wheel from rolling action.

4 Claims, 8 Drawing Figures

PATENTED JAN 29 1974
3,788,109
SHEET 1 OF 2
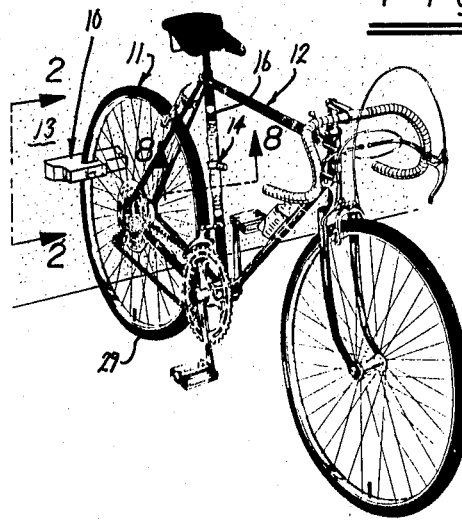
Fig. 1
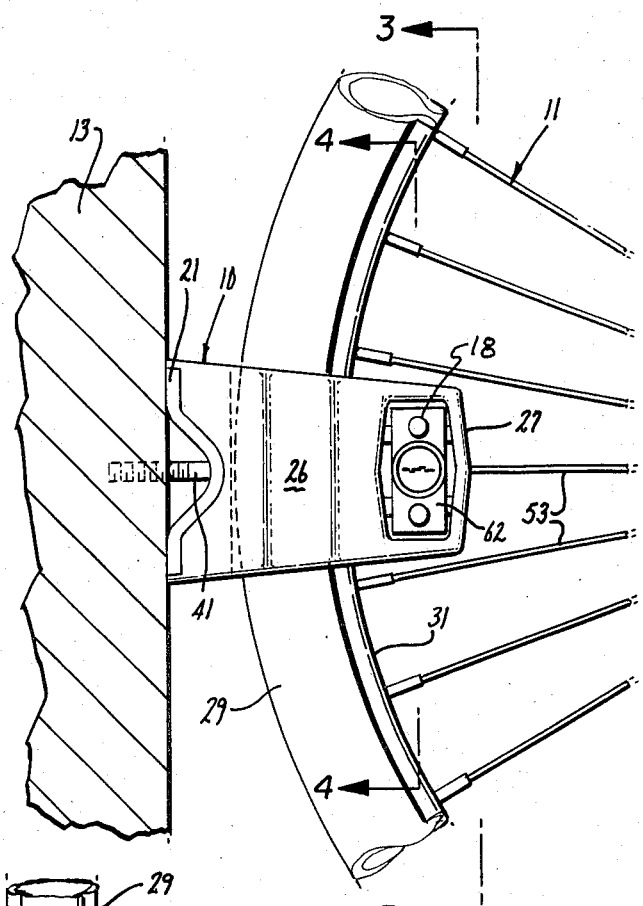
Fig. 2
Fig. 8
Fig. 4

VEHICLE SECURING DEVICE

BACKGROUND OF THE INVENTION AND OBJECTS

This invention concerns locking devices for vehicles having spoked wheels such as bicycles, motorcycles and the like.

An object of the invention is to provide a strong, portable structure for securing a spoked wheeled vehicle by temporarily disabling the wheel thereof and thereby serving to deter theft.

Another object of the invention is to provide means for locking a wheel, such as a bicycle's, in a manner whereby the lock is shielded from tampering, such as by sawing, hammering and the like.

Another object of the invention is to provide an article of the type described which selectively may be either permanently mounted to a stationary structure, such as a sidewalk or a building wall, or may be maintained in portable form and carried on the associated vehicle to be locked.

SUMMARY OF THE INVENTION

In summary the invention concerns a device for securing a vehicle, such as a bicycle by disabling a wheel thereof and comprises a padlock structure having elongate, dismountable shackle connectable to a lock body having access to the lock actuation portion disposed at one end of the lock body. A body or housing of tough resilient material has a channel extending between the sides thereof and sized to receive a tire-equipped, spoked vehicular wheel. Pivotally mounted means are arranged on said body and are shiftable from the closed position extending across said channel to an open position extending outwardly from said body in a non-obstructing relationship to said channel. The body has a compartment therein open at one end and being accessible at said one end and sized to accommodate the body of said padlock. The housing and the pivotal means are each provided with spaced apart, parallel passageways for receiving the shackle of said padlock wherein said shackle portions extend through said passageways securing said pivotal member in the closed condition with respect to the housing.

BRIEF DESCRIPTION OF THE DRAWINGS

FIG. 1 is a perspective view of a preferred embodiment of the present invention shown in cooperative relationship with a bicycle;

FIG. 2 is an enlarged, end view of the present invention taken in the direction of the arrows 2—2 of FIG. 1;

FIG. 4 is a sectional view taken in the direction of the arrows 4—4 of FIG. 2;

FIG. 8 is a sectional view taken in the direction of the arrows 8—8 of FIG. 1.

DESCRIPTION OF THE PREFERRED EMBODIMENT

Figure 3:
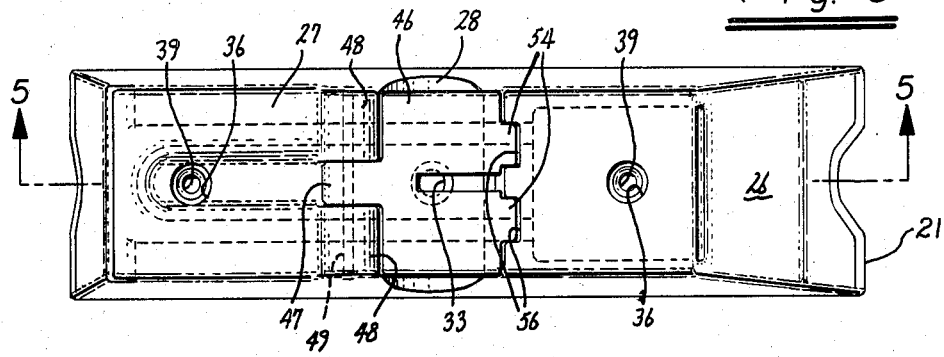
FIG. 3 is a top view taken in the direction of the arrows 3—3 of FIG. 2.

A vehicular securing device 10 according to the present invention is shown in FIGS. 1 and 2 of the drawings. The securing device 10 is shown in operative association with a rear wheel 11 of a bicycle 12 and the securing device 10 is rigidly mounted to a stationary structure 13, such as a building wall. A clamp 14 is arranged on a down tube 16 of the bicycle for mounting the securing device 10 thereon when it is desired to carry the device on the vehicle for subsequent attachment use at the destination (FIG. 8).

In general, the vehicle securing device 10 itself comprises a body or housing 17 and a bicycle padlock 18.

Referring to FIGS. 2 through 6, the body or housing 17 is, in general, of elongate, block-like configuration and includes a bottom wall structure 21 having a long medial recess or indentation 22 configurated for engagement with the down tube 16 of the bicycle (FIG. 8). The side walls 23 are arranged integral with first 24 and second 26 end walls as is the top wall structure 27. A channel 28 is formed integral with the top wall structure and extends through each side wall 23 at a point medial along the length. The channel 28 is of a width sufficient to accommodate the tire 29 of the bicycle 12 and of a depth greater than the radial dimension of the tire 28 and associated wheel rim 31 so that when the wheel is positioned within the channel 28 the top wall portion 27 will be disposed radially inwardly of the wheel rim, as shown in FIG. 2. The channel 28 as viewed in cross section (FIG. 5) is of generally U-shaped configuration provided by the walls 32 which merge at their upper regions with the top wall structure 27 and which at the bottom thereof are fitted against the bottom wall structure 21. An aperture 33 extends through the channel walls 32 and bottom wall member 21 for receiving a threaded projection 34 from the clamp 14, as shown in FIG. 8.

The top wall structure is generally rectilinear in plan, FIG. 3, and is equipped with two wells 36 and 37 located adjacent each end on the center line. At their bottom portions, the wells 36, 37 are telescopically received over upstanding bosses 38 projecting from the bottom member 21. The bosses 38 are each provided with a fastener-receiving aperture 39 for mounting the vehicle securing device to a stationary structure such as illustrated in FIG. 2.

Figure 5:
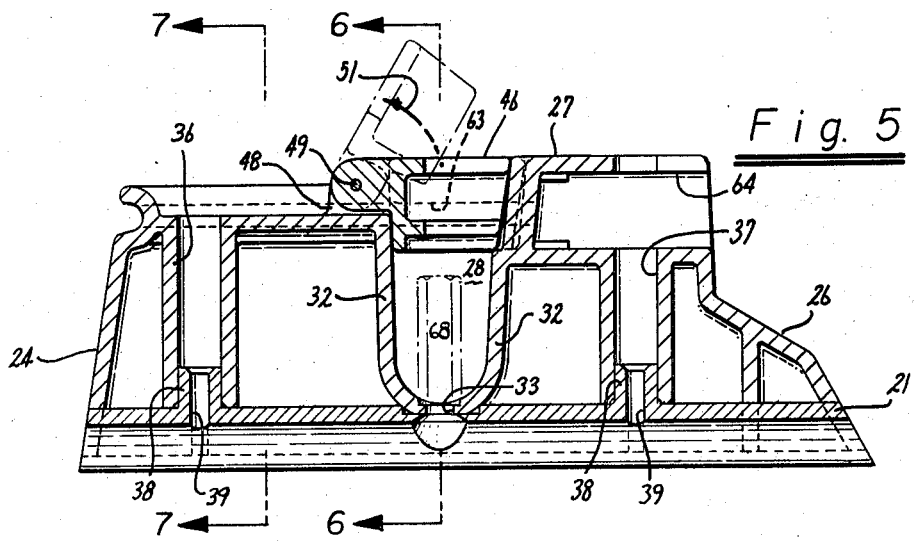
FIG. 5 is an elevational, sectional view taken in the direction of the arrows 5—5 of FIG. 3 with the lock mechanism removed from the assembly.

A bridge member 46 is pivotally mounted on the top wall structure 27 to extend across the channel 28, as shown in full lines in FIG. 5. The bridge structure is pivotally moveable to the outwardly extending condition as indicated by the broken lines in FIG. 5. More particularly, the bridge is provided with a central tang 47 which is received between spaced hinge elements 48 integral with the top wall and a shaft or pin 49 extends through the elements 48 and tang 47 permitting the bridge to pivot as indicated by the arrow 51. Referring particularly to FIG. 4, it may be seen that when the bridge 46 is in the lower condition and when a spoked vehicular wheel is disposed in the channel 28, a spoke 53 of the wheel is received in a slot 52 within the bridge. On the side of the bridge 56 opposite the tang 47 the bridge member is provided with flange members 54 which are received in complimentary recesses 56 within the top structure 27.

Figure 7:
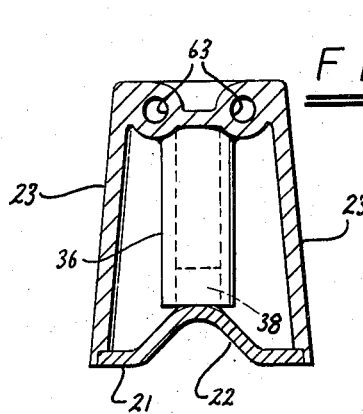
FIGS. 6 and 7 are each lateral, sectional views taken respectively in the direction of the arrows 6—6 and 7—7 of FIG. 5.
Figure 6:
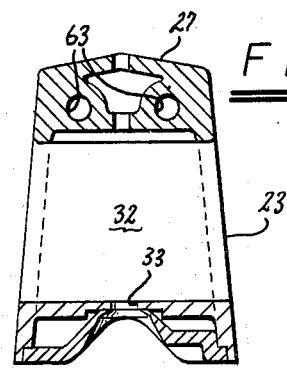

A provision is made in the body device 10 for encasing the padlock 18 in a manner whereby when the device is in the closed or securing condition only the key entrance portion of the padlock is accessible. More particularly, the padlock 18 is of conventional construction associated with a bicycle lock and includes a dismountable bale or shackle 61 and a lock body 62 having the key access portion in the end of the lock body, as shown in FIGS. 2 and 4. The top structure 27 and the bridge member 46 are each provided with aligned spaced pairs of passageways 63 (FIGS. 6 and 7) to receive the shackle member 61, the passageways 63 opening into a compartment 64 which overlies one of the wells 37 (FIG. 5). The compartment 64 is sized and of a configuration to receive the lock body 62. The top wall extends over the end of the lock body but permits access of the key 66 to the open end of the compartment, as illustrated in FIGS. 4 and 5, so that the key 66 may be easily received within the lock body for opening the lock. Through the use of the key the lock body may be withdrawn and dismounted from the bale member. Thus the bale member may be pushed rearwardly for grasping by the fingers and removal from the passageways through the bridge.

As may be seen from FIG. 4, when the lock is in the installed condition the well 37 is covered by the lock body and thus precludes access to the fastener 41 disposed therebelow which attaches the vehicle securing device to the associated wall or other rigid structure 13. This feature precludes dismounting of the vehicle securing device when the device is in the locked condition.

Operation

The vehicle securing device may be used in two modes: first, the device 10 may be rigidly secured in place to an associated stationary structure, such as a wall, concrete sidewalk or the like; or two, the device may be used as a portable securing device and carried from place to place upon the vehicle. When the securing device is mounted in a permanent condition fasteners such as lag screws 41 are mounted in the wells 36, 37 through the apertures 39 in the bottom member 21 to attach the member to the stationary structure. The vehicle may be shifted so that the spoked wheel thereof is received within the channel member 28. The bridge member 46 is placed in the lower condition, as shown in FIG. 5, so that a spoke of the wheel is received within the slot 52. Then the shackle member 61 of the padlock may be inserted into the passageways 63 to extend through those passageways of the bridge member and the lock body may be placed within the compartment 64 to receive the end of the shackle for the locking condition. Thus the vehicle will be secured to a stationary object, the vehicle tire and wheel and rim occupying the positions as shown in FIGS. 2 and 4 of the drawings.

In the second mode of use of the vehicle securing device 10, e.g., in the portable condition, the device is accommodated upon the clamp with the threaded extension 34 arranged on the down tube 16 or other member of the vehicle. An elongate female fastener 68 is accommodated within the channel 28 and is easily rotated by the fingers so that when the bridge 46 is in the raised condition the fastener or nut member 68 may be threaded upon the bolt 34 so as to bring the device into cooperative association with the vehicle. Conversely, the device 10 may be dismounted from the vehicle and placed in the operative relationship with the vehicle wheel as previously indicated. In this condition, the device may serve also as a vehicular stand as well as deterring thieves from attempting to roll the vehicle away.

Other structures may be incorporated into the device to connect it to a post or the like, such structure including chains, stainless steel cable and the like which may be connected to the housing and entwined about the vehicle frame and thereafter to an associated stationary post or the like.

While the above specific features of the invention have been described, it will be apparent to those skilled in the art that modifications or variations may be made thereupon but it is intended that this invention be limited only by the express terms of the following claims.

I claim:

1. Apparatus for securing a vehicle having a wheel with spokes, comprising a body formed from a tough, resilient material, and including a base arranged for affixing said body to an associated support structure, said body having a channel extending therethrough for receiving the wheel of the vehicle to be secured, said body being formed such that said channel has a width at least equal to the diameter of the tire of the associated vehicle and a depth exceeding the dimension of vehicle tire and rim member so that portions of said body are disposed radially inwardly of the rim, bridge means pivotally mounted on said body and movable from a first position permitting access to said channel to a second position extending across said channel in said body, said bridge means having a slot therethrough serving to receive therein a spoke from the vehicle wheel, a padlock including an elongate shackle member dismountable from a lock body member, passageway means arranged in said bridge and said body for shieldably receiving said shackle member, and means in said body providing a compartment for receiving said lock body member, said compartment being arranged in communication with said passageway means at one end and providing access to said padlock body for operating the lock at another end of the compartment.

2. Apparatus as expressed in claim 1 wherein said base of said body is provided with a longitudinally extending recess therein, means in said body defining an aperture opening into said recess at one end and into said channel at the other end thereof, clamp means adapted to encircle a circular support element and having an elongate first fastener means projecting therefrom for receipt into said aperture when mounting said apparatus on said clamp means, and second fastener means cooperable with said first fastener means for securing said clamp means to said body.

3. The apparatus as defined in claim 2 wherein there is provided means arranged beneath said compartment defining in said base a fastener-receiving aperture extending therethrough, and means in said body defining a passageway through said compartment in the empty condition thereof permitting access to said fastener-receiving aperture, the lock member when disposed in said compartment blocking access to said fastener-receiving aperture.

4. The apparatus defined in claim 1 wherein the body of tough material is of a size and weight to be readily portable and wherein the lock body member is arranged so that said compartment encloses all portions of said lock body member except for the portion thereof serving for lock operation.

* * * * *